United States Patent [19]
Karstensen et al.

[11] Patent Number: 5,923,451
[45] Date of Patent: Jul. 13, 1999

[54] MEANS FOR CONNECTING ELECTRONIC DEVICES FOR COMMUNICATION WITH ONE ANOTHER

[75] Inventors: Holger Karstensen, Hohenbrunn; Helmut Zarschizky, München; Christian Gerndt, Geretsried; Hartmut Schneider, München, all of Germany

[73] Assignee: Siemens Aktiengesellschaft, Munich, Germany

[21] Appl. No.: 08/809,716

[22] PCT Filed: Sep. 26, 1995

[86] PCT No.: PCT/DE95/01331

§ 371 Date: Mar. 27, 1997

§ 102(e) Date: Mar. 27, 1997

[87] PCT Pub. No.: WO96/10763

PCT Pub. Date: Apr. 11, 1996

[30] Foreign Application Priority Data

Sep. 30, 1994 [DE] Germany .................. 44 35 220

[51] Int. Cl.⁶ .................................................. H04B 10/00
[52] U.S. Cl. ................................................ 359/163; 359/152
[58] Field of Search .................................. 359/163, 152, 359/109; 385/24

[56] References Cited

U.S. PATENT DOCUMENTS

| | | | |
|---|---|---|---|
| 4,612,670 | 9/1986 | Henderson | 359/163 |
| 4,850,044 | 7/1989 | Block et al. | 359/163 |
| 4,870,637 | 9/1989 | Follett et al. | 359/163 |
| 4,872,739 | 10/1989 | Kahn et al. | 350/96.16 |
| 5,245,680 | 9/1993 | Sauter | 385/24 |

FOREIGN PATENT DOCUMENTS

| | | |
|---|---|---|
| 0 366 974 | 5/1990 | European Pat. Off. . |
| 0 486 208 | 5/1992 | European Pat. Off. . |

OTHER PUBLICATIONS

Japanese Abstract, vol. 008, No. 194, JP 59–82779 (A).
Stone et al., "Computer Architecture in the 1990s", Sep. 1991, pp. 30–38.
Tsang, "High–Speed Optical Interconnections for Digital Systems", MIT Journal, Sep. 1991, pp. 31–44.

*Primary Examiner*—Kinfe-Michael Negash
*Attorney, Agent, or Firm*—Hill & Simpson

[57] ABSTRACT

An active electrical-optical rear wall for connection of electronic devices to be brought into communication with one another, in plug-in technology, whereby optoelectronic terminal installations for respective connection of an electronic device are arranged on the rear wall, which installations are connected, by means of unguided beam connections, with optical transmission channels that connect adjacent terminal installations with one another, whereby each terminal installation respectively comprises one optoelectrical transmission and reception unit per transmission channel, which unit can be connected, by means of an optical unguided beam connection, with an optoelectrical transmission and reception unit of an electronic device that is to be connected to this terminal installation. The transmission channels form a bus whose operation is completely independent of whether electronic devices are connected to terminal installations or not. conventional bus operation and a broadcast are both possible, as well as a combination of conventional bus operation with additional broadcast.

23 Claims, 5 Drawing Sheets

Ⓢ =Transmitter  Ⓡ =Receiver

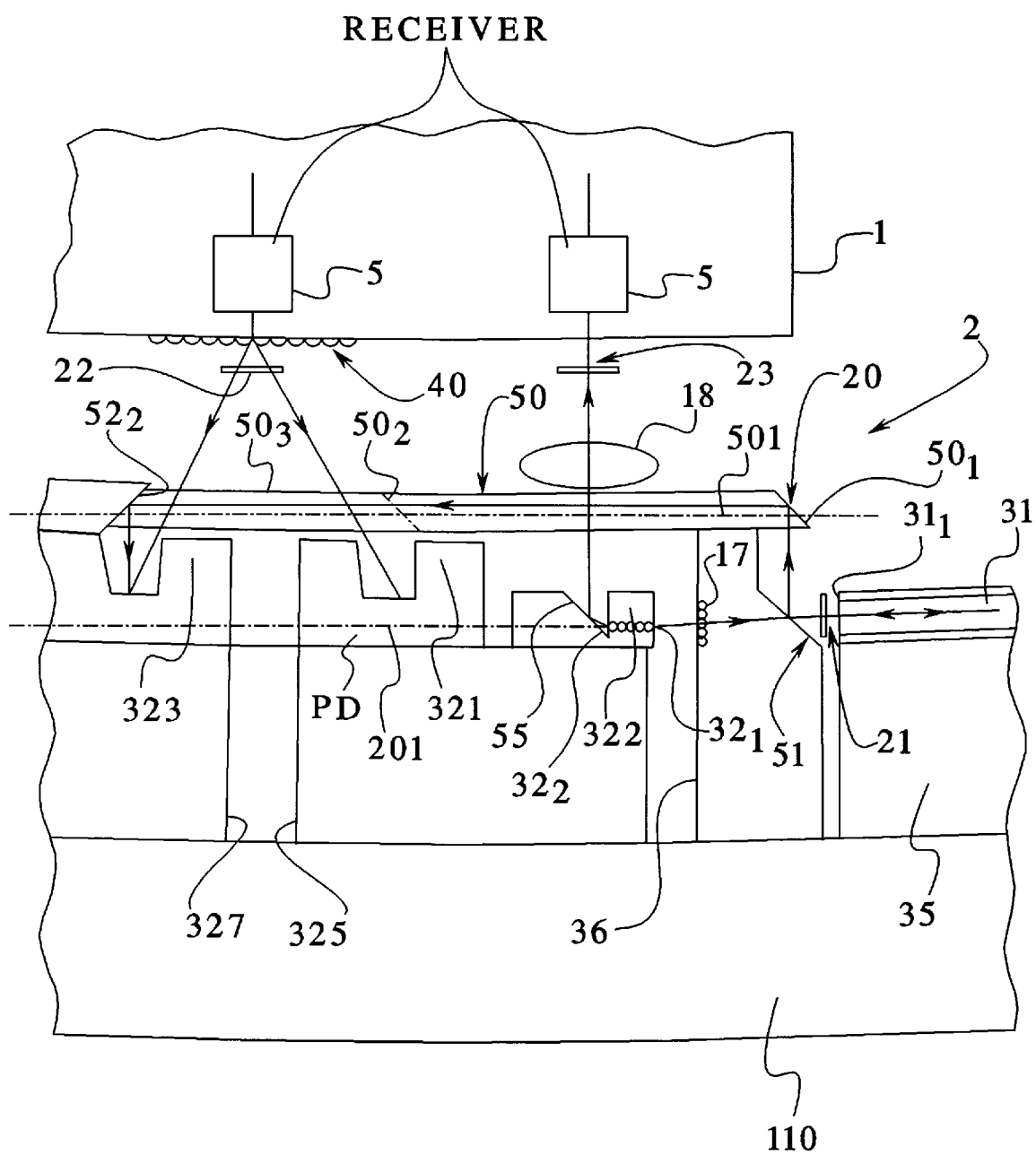

MEANS FOR CONNECTING ELECTRONIC DEVICES FOR COMMUNICATION WITH ONE ANOTHER

FIELD OF THE INVENTION

The present invention relates generally to optical connections between electronic devices for communication with one another. More specifically, the present invention relates to optoelectronic connectors for electronic devices which can assume the function of a data bus, a broadcast network or a combination of the two.

DESCRIPTION OF THE PRIOR ART

Electronic devices can be brought into communication with one another by means of buses, which have acquired enormous importance in data technology. This is due in particular to the fact that a bus represents a very universal data network to be used, which permits a plurality even of very different electronic devices to communicate with one another.

Until now, the data throughput of a bus given by word length times data rate had low values. The data rate amounted to a maximum of a few Mbit/s; the word length was generally 8 bits for external buses and 16 bits for internal buses. Very simple data lines could be used, in which it was hardly necessary to pay attention to matching of wave resistances or crosstalk. In the meantime, data throughput demands have increased sharply, and will increase further in the future due to the increased use of parallel computers, as well as external mass memories (shared memories). In buses constructed with purely electrical lines, the data throughput is actually increased by an enlargement of the bus width, but with purely electrical lines, one runs increasingly up against limits. In general, it can be assumed that data rates up to a maximum of about 100 to 400 Mbit/s are still possible for electrical bus lines (see 1 and 2). If, beyond this, it is desired to reach higher data rates, or to reduce the dimensions of the bus because insufficient surface is available, it is necessary to work with optical methods.

SUMMARY OF THE INVENTION

The present invention is based on the aim of providing an active electrical-optical means for connecting electronic devices to be brought into communication with one another, which means can assume the function of a bus, of a broadcast network, or else also a combination of these two.

In the form of an active electrical-optical rear wall, the inventive means is advantageously suited for electronic devices in plug-in technique, e.g. a housing as a frame, e.g. 19" frame, electronics as plug-in cards, and particularly for newer construction techniques, such as e.g. with multi-clip modules (MCM).

Through the use of optical transmission channels in the form of optical waveguides, a maximally high packing density can be achieved even for high data rates, which packing density lies well above that of electrical lines.

The replacing of electrical plugs with optical unguided beam connections at the inputs and/or outputs, to be coupled to the optical transmission channels, of the terminal installation, and in the inputs and outputs allocated to the electronic devices, has the advantage of a channel density that is considerably higher (by a factor of about 10 to 20) in comparison with electrical plugs, and in addition there is no crosstalk due to radiation at the plug connection, as well as no impulse distortion due to inductive effects. In addition, the mechanical forces required for plugging and withdrawal of the cards are greatly reduced, since only a few electrical plugs are still required, mainly for the current supply.

The present invention also comprises a version in which the transmission channels are electrical channels, whereby each transmission channel comprises at each end an optical input and output, optically connected with an input and/or output of an optoelectronic terminal installation, and at each end of the transmission channel an optoelectrical transducer is provided for the conversion of optical signals into electrical signals and vice versa. This corresponds to a replacement of electrical plug connections with optical connections, e.g. optical plugs.

Accordingly, the present invention provides an apparatus for optically and electrically connecting a plurality of electronic components which comprises a plurality of spaced-apart optoelectronic terminals arranged on a base element. Each optoelectronic terminal is connected to an electronic component. Each terminal further comprises a left side optical input and output and a right side optical input and output. At least one input of each terminal being optically connected to a transmitter that is connected to the electronic component associated with the terminal and at least one output of each terminal being optically connected to a receiver which in turn is connected to the electronic component associated with that terminal. Adjacent terminals are connected by transmission channels which link at least one output of one terminal to an input of an adjacent terminal and the inputs and outputs of the respective right and left sides of each terminal are, in turn, optically connected by a parallel connection channel.

In an embodiment, the parallel connection channels are further characterized as being optoelectrical channels.

In an embodiment, the electronic components transmit an optical signal to both the right side optical input and the left side optical input of the terminal to which they are connected.

In an embodiment, at least one of the electronic components receives an optical signal from both the right side optical output and the left side optical output of the terminal to which they are connected.

In an embodiment, at least one electronic component transmits a single optical signal from the transmitter to either the right side optical input or the left side optical input of the terminal to which it is connected.

In an embodiment, at least one of the transmission channels comprises an optical waveguide.

In an embodiment, at least one of the transmission channels is optically connected to its respective terminal by an optical unguided beam connection.

In an embodiment, at least one of the transmitters is optically connected to its respective terminal by an optical unguided beam connection.

In an embodiment, at least one of the receivers is optically connected to its respective terminal by an optical unguided beam connection.

In an embodiment, at least one of the electronic components is optically to its respective terminal by an optical unguided beam connection.

In an embodiment, at least one optical multiplexer/demultiplexer is disposed on the base element between the transmission channels of adjacent terminals.

In an embodiment, the connection channel that connects the optical input of the right side of a terminal to the optical output of the left side of the terminal comprises a first optical detector which detects an optical signal supplied from the input of the right side and which in turn produces a first electrical signal corresponding to the optical signal supplied from the input of the right side. The connection channel further comprises a first controllable optical transmitter connected to the first optical detector which receives the first electrical signal and produces a first optical signal corresponding to the first electrical signal. The first optical signal is then communicated by the first transmitter to the output of the left side. Similarly, a connection channel that connects the optical input of the left side of the terminal with the optical output of the right side of the terminal comprises a second optical detector which receives an optical signal supplied from the input of the left side and which generates a second electrical signal corresponding to the optical signal supplied from the input of the left side. This connection channel further comprises a second controllable optical transmitter which is connected to the second optical detector and which receives the second electrical signal and, in turn, generates a second optical signal which is communicated to the output of the right side.

In an embodiment, amplifiers are used to amplify the first and second electrical signals.

In an embodiment, the component optical signal produced by the transmitter of the electrical component is received by both the first and second optical detectors. As a result, the first optical detector produces a third electrical signal which corresponds to the component optical signal communicated from the transmitter. The third electrical signal is communicated to the first controllable optical transmitter which in turn generates a third optical signal and communicates the third optical signal to the output of the left side. Similarly, the second optical detector produces a fourth electrical signal in response to the receipt of the component optical signal from the transmitter of the electrical component and, in turn, transmits the fourth electrical signal to the second controllable optical transmitter. The second controllable optical transmitter in turn generates a fourth optical signal corresponding to the fourth electrical signal and communicates that fourth optical signal to the output of the right side.

In an embodiment, the first and second controllable optical transmitters each comprise a semiconductor laser which includes two opposingly directed radiation exit windows which effectively convert an electrical signal into two oppositely directed optical signals, one of which is directed toward an output (either a right output or a left output) and the other of which is deflected toward a receiver connected to the electrical component associated with the terminal. Accordingly, an electrical signal received from an optical detector is transmitted by a semiconductor laser to both a receiver connected to the electrical component as well as to an output. Using the terminology discussed above, an electrical signal received by the first controllable optical transmitter which includes a semiconductor laser will split an electrical signal received from the first optical detector into an optical signal directed toward the left output of the terminal as well as into an optical signal directed toward a receiver connected to the electrical component. Similarly, an electrical signal received by the second controllable optical transmitter (which comprises a semiconductor laser) will be split into an optical signal directed toward the right output of the terminal as well as to an optical signal directed toward a receiver connected to the electrical component associated with the terminal.

Still further, in an embodiment, semitransparent deflecting mirrors are employed to split an optical signal being directed from a semiconductor laser or controllable optical transmitter to an output. Specifically, a first semitransparent deflecting mirror disposed between the first controllable optical transmitter and the left side output splits a signal being sent from the first controllable optical transmitter toward the left output into a signal sent to the left output as well as a signal directed toward the second optical detector. The portion of the signal directed toward the second optical detector may be further directed by employing additional mirrors. Similarly, an optical signal being communicated from the second controllable optical transmitter toward the right output of the terminal may be split by a second semitransparent deflecting mirror into an optical signal directed toward the right output as well as an optical signal directed toward the first optical detector. Again, additional directing mirrors may be employed to redirect the signal from the semitransparent deflecting mirror toward the first optical detector.

BRIEF DESCRIPTION OF THE DRAWINGS

The invention is described in more detail by means of examples in the following specification on the basis of the figures, in which:

FIG. 6 is a side sectional view of an embodiment of the present invention as illustrated in to FIG. 5.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
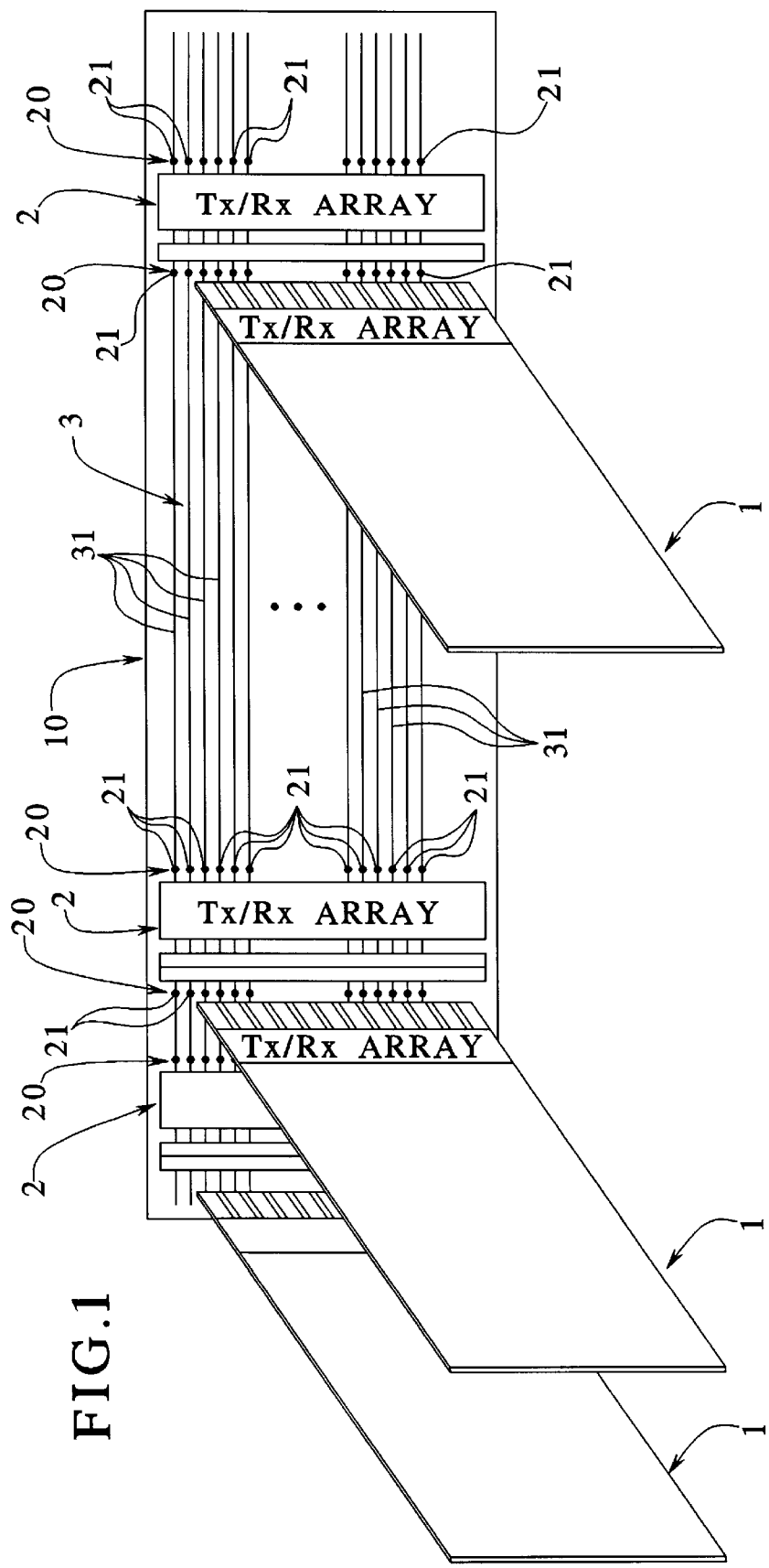
FIG. 1 shows a perspective schematic view of the present invention in the form of a rear wall with inventive opto-electronic terminal installations, arranged at a distance from one another, for electronic devices in the form of plug-in cards that are optically connected to the transmission channels via the terminal installations.

The inventive means shown in FIG. 1 for connecting electronic devices components 1 to be brought into communication with one another consists of a number of optoelectronic terminal installations 2, which are provided from a bearer or base element 10, e.g. a rear wall of a housing, and are arranged at a distance from one another, and are provided for the respective connection of one electronic device 1, e.g. a plug-in card.

Each terminal installation 2 comprises two rows 20 in the form of a right side and a left side, each having a number N of optical inputs and/or outputs 21, N being the same number for both rows 20, for the transmission and reception of optical signals.

As is specified later in connection with FIG. 5, each input and/or output 21 of each row 20 respectively comprises at least one component optical input 22, which is optically connected or can be optically connected with this input and/or output 21, for the reception of a component optical signal produced by a transmitter 4, allocated to this input 22, of a connected electronic device 1, and respectively comprises at least one component optical output 23, which is optically connected or can be optically connected with this input and/or output 21, for the transmission of an optical signal to an optical receiver 5, allocated to this output 23, of this connected electronic device 1.

Figure 4:
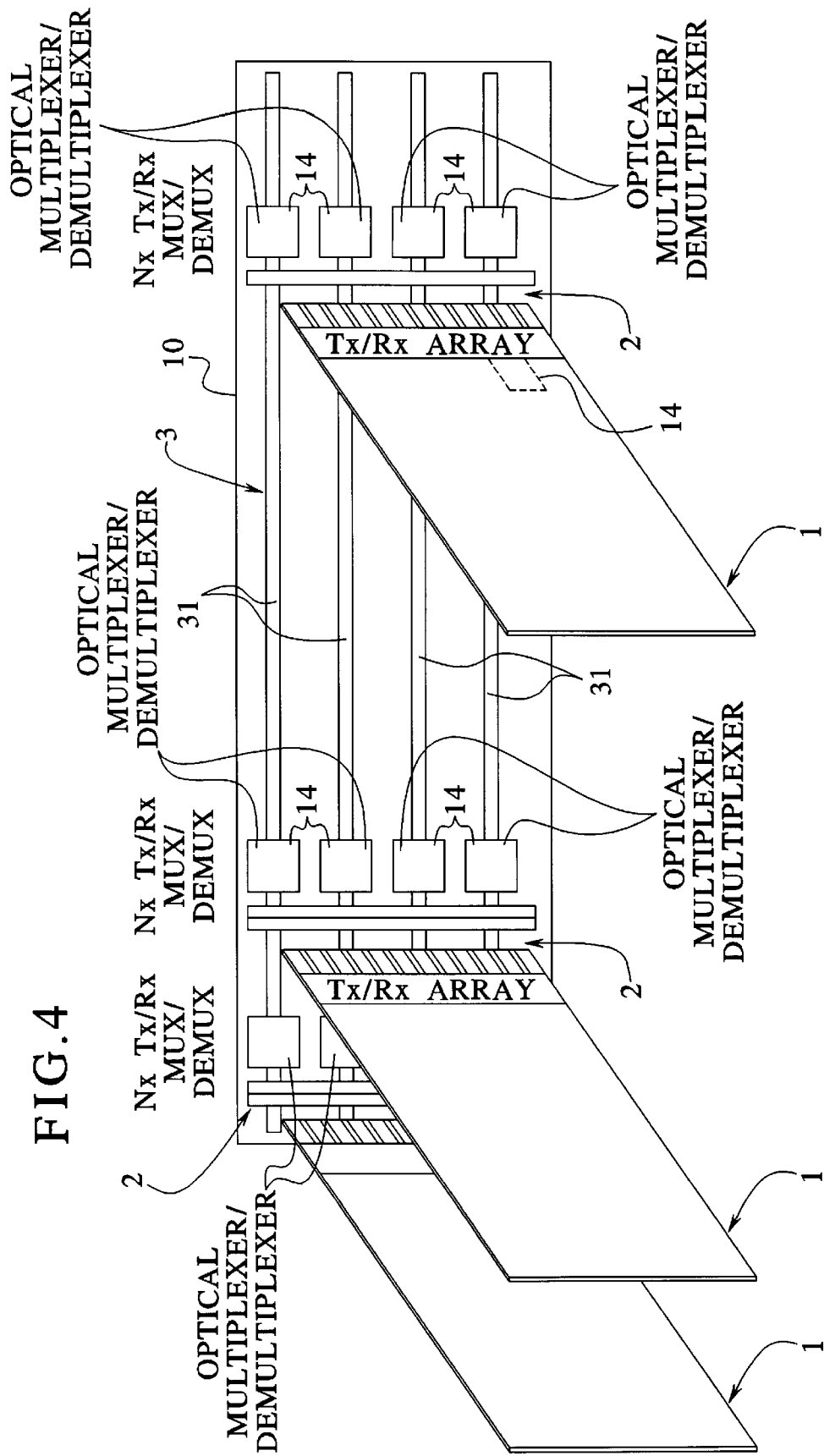
FIG. 4 is a perspective schematic view of the present invention in the form of a rear wall with inventive opto-electronic terminal installations, arranged at a distance from one another, for electronic devices in the form of plug-in cards that are optically connected to the transmission channels via the terminal installations, whereby, in contrast to the means according to FIG. 1, optical multiplexers/demultiplexers are arranged in the transmission channels in each terminal installation.

The inputs and/or outputs 21 of two mutually allocated rows 20 of respectively adjacent terminal installations 2 can be connected with one another, preferably in parallel, by means of e.g. parallel transmission channels 31, of which each, according to FIG. 4, comprises optical inputs and/or outputs $31_1$ for the coupling in and/or coupling out of optical signals into and out of this transmission channel 31.

The inputs and/or outputs 21 of the two rows 20 of each terminal installation 2 are connected in parallel with one another or can be connected in parallel with one another by means of parallel optical connection channels 32, which are described later in connection with a transmission and reception unit of the terminal installation 2.

Figure 5:
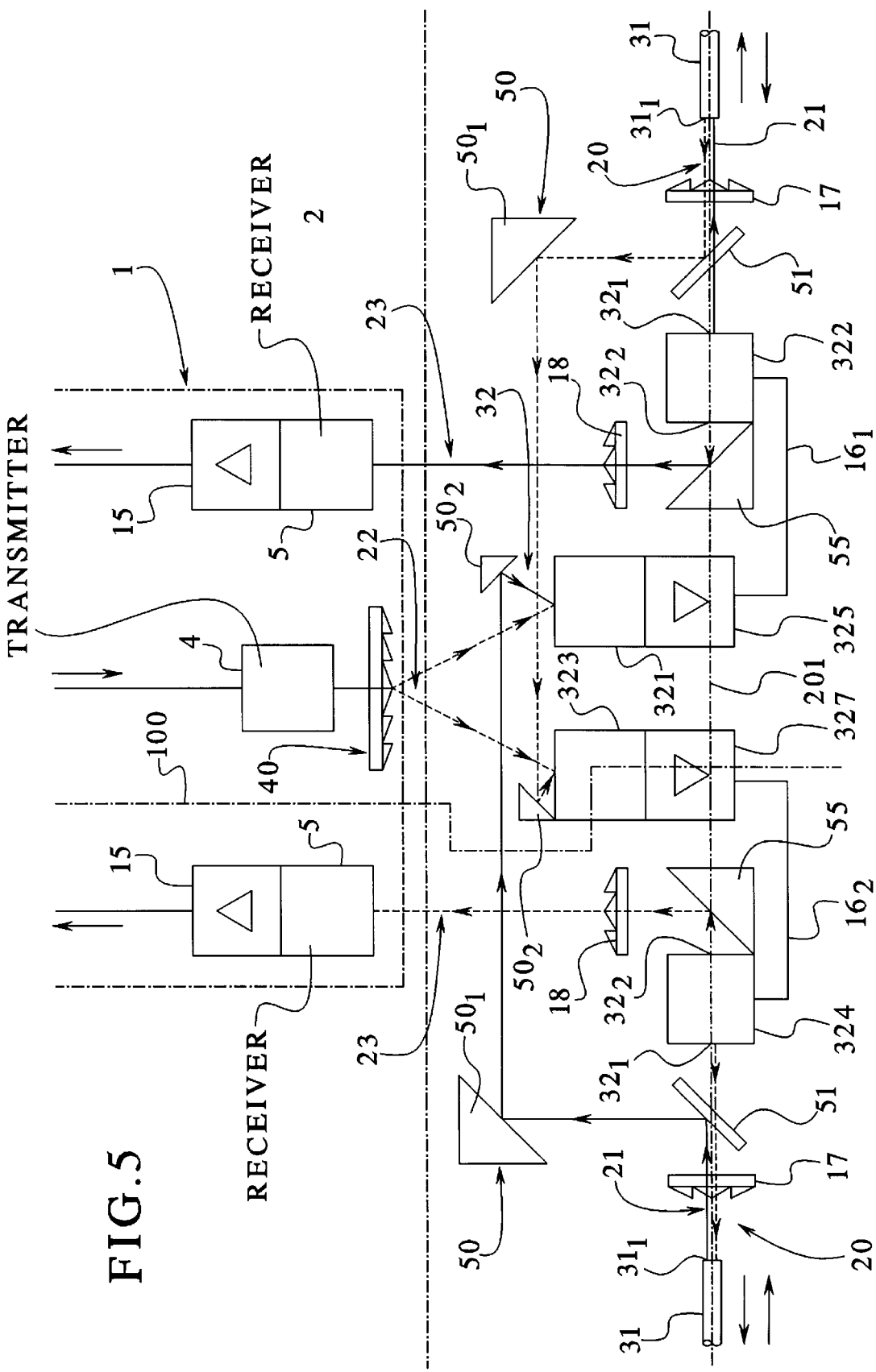
FIG. 5 is a schematic illustration of a transmission and reception unit of a terminal installation, which unit is allocated to a single transmission channel, and which optically connects an input and/or output of a row of said terminal installation, which input and/or output is allocated to said channel, with an input and/or output, allocated to said channel, of the other row of said terminal installation, and illustrates a transmission and reception unit, optically connected with said transmission and reception unit, of an electronic device connected to this terminal installation.

In connection with FIG. 5, it is also specified that each terminal installation 2 and each electronic device 1 comprises one transmission and reception unit per transmission channel 31, and that mutually allocated transmission and reception units of the terminal installation 2 and of the device 1 connected to this terminal installation 2 ensues by means of an optical unguided beam connection, so that no electrical plugs are necessary, except those for the power supply of the respective card. The signal is also regenerated in each terminal installation. The design allows a modular construction, since for each additionally required electronic device 1, only one terminal installation 2 respectively needs to be installed on the bearer element 10.

The transmission channels 31 form a bus 3 whose operation is completely independent of whether electronic devices 1 are connected to terminal installations 2 or not. An exchange of electronic devices 1 during operation is thus possible without disturbance.

FIG. 1 indicates the inputs and/or outputs 21 of each terminal installation by means of black dots on the transmission channels 31, which are represented by horizontal black lines, whereby, for the sake of clarity, not all the e.g. twelve represented inputs and/or outputs of each row 20 of each terminal installation 2 are provided with the reference character 21, and not all of the e.g. twelve represented transmission channels are provided with the reference character 31. In general, the number of transmission channels 31 is equal to N and the number of terminal installations 2 is equal to M, whereby N and M are respectively whole numbers that in principle can be chosen arbitrarily.

The inventive means can be constructed by means of a corresponding layout for all standardly known modes of operation.

1) Each electronic device 1 exploits equally the full width of the bus 3. According to FIG. 2, each electronic device 1 comprises one optical transmitter 4 per transmission channel 31, which transmitter transmits optical signals on this channel 31, and one optical receiver 5, which receives optical. signals from this channel 31, so that transmission and reception take place on each channel 31. There is always only one transmitter 4 and many receivers 5, of which one switches automatically to further reception by means of the address recognition, e.g. by sending back a signal for reception readiness. For example, an electronic device 1 transmits on all channels 31; the other devices 1 listen.

2) At least one fixedly defined transmission channel 31 is allocated to each electronic device 1, on which channel only this electronic device 1 transmits. Thus, e.g. according to FIG. 3 the first transmission channel 31 is allocated to the first device 1, on which channel only this first device 1. transmits with an optical transmitter 4, while this first device receives from each of the remaining transmission channels 31 with one receiver 5 respectively. The second channel 31 is allocated to the second device 1, on which channel only this second device 1 transmits with an optical transmitter 4, while this second device receives from each of the remaining channels 31 with one receiver 5 respectively. The third channel 31 is allocated to the third device 1, on which channel only this third device 1 transmits with one transmitter 4, while this third device 1 receives from all remaining channels 31 with one receiver 5 respectively. Finally, the Nth channel 31 is allocated to the Mth device 1, on which channel only this device 1 transmits with a transmitter 4, while this device 1 receives from all remaining channels 31 with one receiver 5 respectively. In this way, a broadcast is possible in which each receiver 5 knows from the outset from which electronic device 1 the data are coming. For example, each electronic device is entitled to one channel 31 on which it transmits; the other devices 1 listen.

Figure 2:
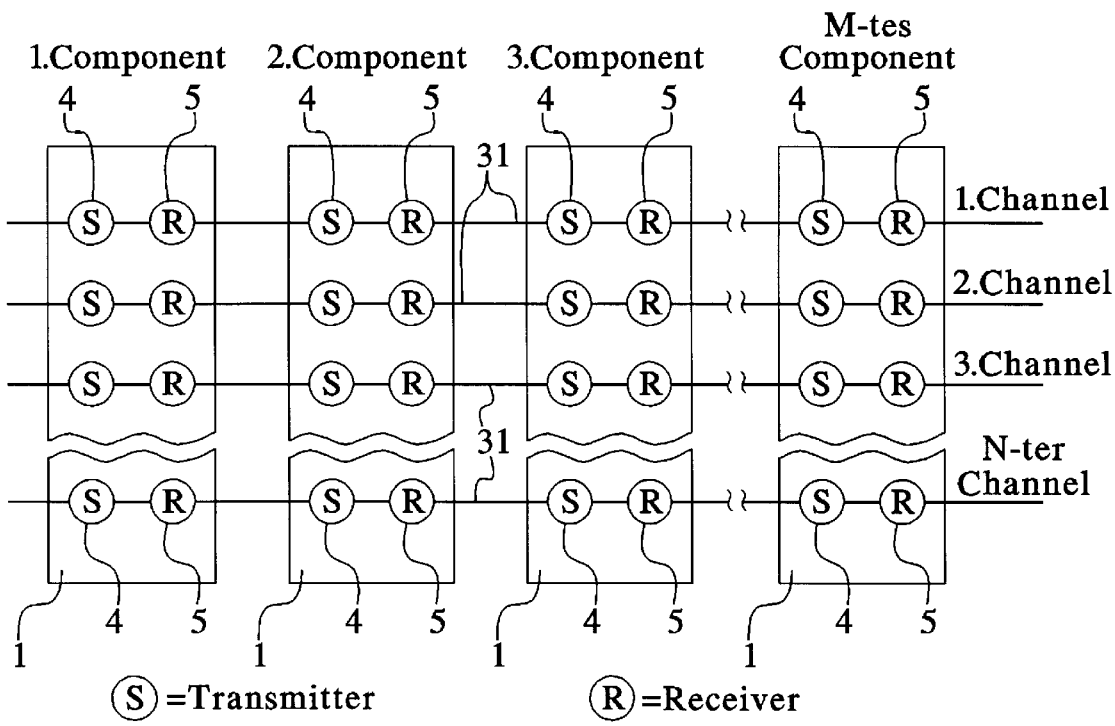
FIG. 2 is a schematic representation of the present invention that is wired as a bus.
Figure 3:
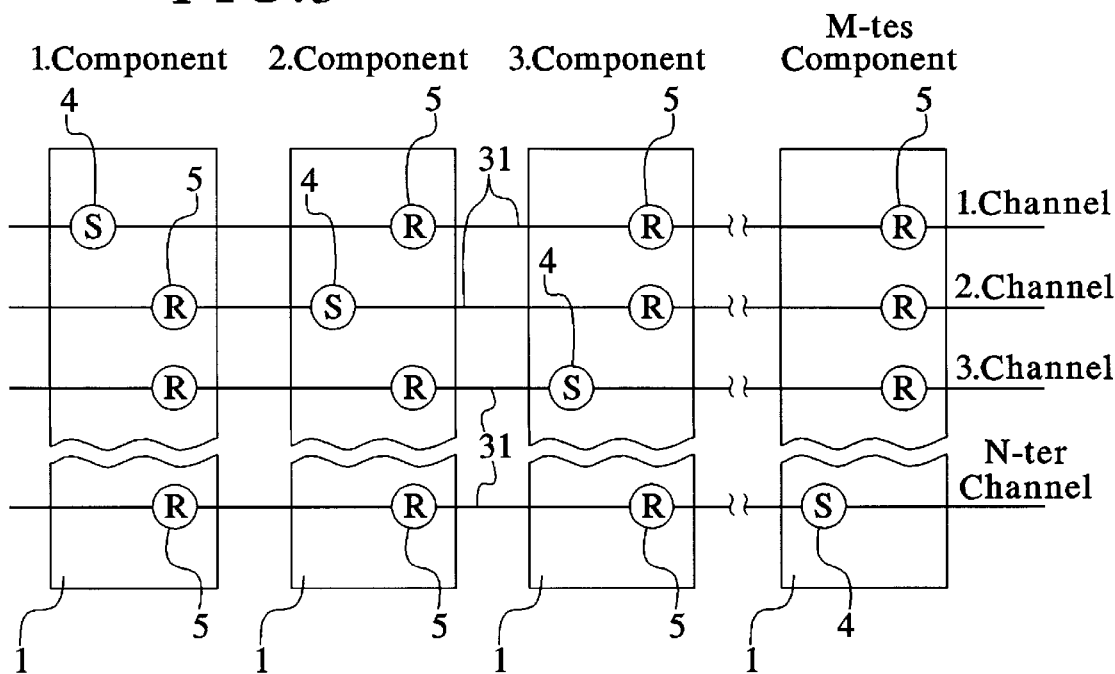
FIG. 3 is a schematic view of the present invention wired as a broadcast network.

The electronic devices 1 according to FIG. 3 can be constructed exactly as the devices: 1 according to FIG. 2, i.e. each device 1 according to FIG. 3 can respectively comprise one transmitter 4 and one receiver 5 per channel 31. The difference of a device 1 according to FIG. 3 in contrast to a device 1 according to FIG. 2 consists only in that, of all the existing transmitters 4, only one determined transmitter 4 is released for transmission, and the other transmitters 4 are not. In contrast, all receivers 5 can receive, e.g. also those not shown in the first device 1 according to FIG. 3, but as in the receiver 5 present in the first device 1 according to FIG. 2, which receiver is allocated to the first channel 31. In place of only one transmitter 4, according to the number of present channels 31, a determined series of transmitters 4 of an electronic device 1 can be released for transmission. The releasing can be carried out with set switches, e.g. DIP switches.

3) The bus operation according to 1) can be combined with the broadcast operation according to 2), so that conventional bus operation is realized with additional broadcast.

It is also possible to use a multiplex method on the bearer element 10. For this purpose, at least one optical multiplexer/demultiplexer is allocated to a terminal installation 2. For example, according to FIG. 4 several, e.g. four, optical multiplexers/demultiplexers 14 are allocated to each terminal unit 2, which multiplexers/demultiplexers are arranged on the bearer element 10. A multiplexer/demultiplexer 14 can be e.g. an optical wavelength multiplexer/demultiplexer, which receives several optical wavelengths from an electronic device 1 connected to the relevant terminal installation 2, and gives these wavelengths to an individually allocated transmission channel 31, which in general, thus also in the embodiments according to FIGS. 1 to 3, can consist of an optical waveguide. This multiplexer/demultiplexer 14 receives several optical wavelengths from this channel 31, and distributes them, in the allocated terminal installation 2, to an electronic device 1 connected to this terminal installation 2.

A multiplexer/demultiplexer 14 call also be fashioned on an electronic device 1, as indicated for the electronic device 1 at the outer right in FIG. 4 in broken lines.

Through the use of a multiplex method, it is possible to achieve a better exploitation of the optical transmission channels, or, respectively, to increase the reliability of the inventive means. Whether the multiplexers and demultiplexers are installed on the bearer element 10, on the electronic devices 1, or else both on the bearer element 10 and on the electronic devices 1, depends on the desired characteristics of the data connections. All the combinations are practicable.

FIG. 5 illustrates the principle of design of a transmission and reception unit, allocated to a single transmission channel 31, of a terminal installation 2, and of a transmission and reception unit, connected optically with said transmission and reception unit, of an electronic device 1 connected to this terminal installation 2. The transmission and reception units, allocated respectively to the other channels 31, of this terminal installation 2, and of this connected electronic device 1, respectively comprise the same principle of design.

According to FIG. 5, the transmission and reception unit of the terminal installation 2 comprises an electro-optical connection channel 32 that optically connects the input and/or output 21, allocated to this transmission channel 31, of a row 20 of the terminal installation 2 optically with the input and/or output 21 of the other row 20 of this terminal installation 2. The connection channel 32 could also be a purely optical connection channel, which comprises for example an optical amplifier, e.g. an optical fiber amplifier, for a signal regeneration, which is possible given electro-optical design.

The connection channel 32 comprises an optical detector 321, allocated to the input and/or output 21 of the left row 20 of the terminal installation 2, for the detection of an optical signal supplied by this input and/or output 21, and the production of an electrical signal corresponding to this detected optical signal, and comprises a controllable optical transmitter 322, allocated to this detector 321 and controlled by this electrical signal, for the production of an optical signal corresponding to this electrical signal, which optical signal is supplied to the input and/or output of the right row 20 of this terminal installation 2.

The optical signal from the input and/or output 21 of the left row 20 originates from the input and/or output $31_1$ of the left part of the transmission channel 31, and is supplied to the input and/or output 21 of the left row 20 of the terminal installation 2 as an unguided beam or, respectively, as freely propagating optical waves, so that an optical unguided beam connection exists between these inputs and/or outputs $31_1$ and 21.

The connection channel 32 also comprises an optical detector 323 allocated to the input and/or output 21 of the right row 20 of the terminal installation 2, for the detection of an optical signal supplied by this input and/or output 21, and the production of an electrical signal corresponding to this detected optical signal, and comprises a controllable optical transmitter 324, allocated to this detector 323 and controlled by this electrical signal, for the production of an optical signal corresponding to this electrical signal, which optical signal is supplied to the input and/or output 21 of the left row 20 of the terminal installation 2.

The optical signal supplied to this detector 323 originates from an input and/or output $31_1$, of the right part of the transmission channel 31, and is supplied to the input and/or output 21 of the right row 20 of the terminal installation 2 by means of an unguided beam, so that an optical unguided beam connection also exists between these inputs and/or outputs 21 and $31_1$.

An input and/or output $31_1$ of a transmission channel 31 can for example be a frontal surface of an optical waveguide that forms the transmission channel 31, through which surface light can exit from the waveguide and can enter into the waveguide.

The electrical signal produced by each detector 321 and 323 is preferably supplied to an electrical amplifier 325 or, respectively, 327 allocated to this detector, which amplifier amplifies this electrical signal. The amplified electrical signal from the electrical amplifier 325 is supplied to the optical transmitter 322, e.g. via an electrical line $16_1$, and the amplified electrical signal from the electrical amplifier 327 is for example supplied to the optical transmitter 324 via an electrical line $16_2$.

In addition, the terminal installation 2 comprises an optical input 22 that accepts a signal by an optical transmitter 4 of the transmission and reception unit, allocated to this transmission channel 31, of the electronic device 1 connected to this terminal installation 2, and supplies it to each of the two detectors 321 and 323.

In place of only one optical input, in the example according to FIG. 5 two inputs 22 can also for example be provided, whereby one input is provided for the beam supplied to the one detector 321 and the other input 22 is provided for the beam supplied to the other detector 323.

An electro-optical connection of this input 22 with the input and/or output 21 of the left row 20 of the terminal installation 2 is formed by the detector 323 allocated to the input and/or output 21 of the right row 220 and by to the optical transmitter 324 allocated to this detector 323. An electro-optical connection of the input 22 with the input and/or output 22 of the right row 20 of this terminal installation 2 is formed by the input and/or output 21 of the detector 321 allocated to the left row 20 and by to the optical transmitter 322 allocated to this detector 321.

An optical signal produced by the optical transmitter 322 of the terminal installation 2 is supplied to a right output 23 of the terminal installation 2, while an optical signal produced by the optical transmitter 324 of the terminal installation 2 is supplied to a left output 23 of this terminal installation 2.

An electro-optical connection of the right output 23 with the left input and/or output 21 of the terminal installation 2, to which input and/or output this optical transmitter 322 is allocated, is formed by the detector 321 allocated to this input and/or output 21 and by to this optical transmitter 322. An electro-optical connection of the left output 23 with the input and/or output 21 of the terminal installation 2, to which the optical transmitter 324 is allocated, is formed by the detector 323 allocated to this input and/or output 21 and by the optical transmitter 324.

Each optical transmitter 322 and 324 preferably consists respectively of a semiconductor laser with two radiation exit windows $32_1$ and $32_2$ opposite one another, from which the produced laser radiation radiates in directions opposed to one another. The laser radiation radiated from the radiation exit window $32_1$ of the semiconductor laser 322 is supplied to the input and/or output 21 of the right row of the terminal installation 2, and the laser radiation radiated from the other radiation exit window $32_2$ of this semiconductor laser 322 is supplied to the right output 23 of the terminal installation 2. The laser radiation radiated from the radiation window $32_1$ of the semiconductor laser 324 is supplied to the input and/or output 21 of the left row 20 of the terminal installation 2, and the radiated laser radiation of the semiconductor laser 324 is supplied to the left output 23 of the terminal installation 2.

The two semiconductor lasers 322 and 324 are arranged on an axis 201 that connects the input and/or output 21 of the left row 20 with the input and/or output 21 of the right row 20 of the terminal installation 2. Each semiconductor laser 322 and 324 radiates in both directions of this axis 201.

A semitransparent deflecting mirror 51 is arranged obliquely between the input and/or output 21 of the right row 20 and the semiconductor laser 322, at an angle of e.g. 45° to the axis 201, for the deflection, at e.g. a right angle from the axis 201, of at least a portion of the optical signal, supplied from this input and/or output 21 along the axis 201, and in order to let through at least a portion of the laser radiation emitted from the radiation exit window $32_1$ of this semiconductor laser 322 in the direction toward this input and/or output 21.

A semitransparent deflecting mirror 51 is arranged obliquely on the axis 201, between the input and/or output 21 of the left row 20 of the terminal installation 2 and the semiconductor laser 324, at an angle of e.g. 45° to the axis 201, for the deflection out of the axis 201 of at least a portion of an optical signal supplied from this input and/or output 21 along the axis 201, and in order to let through at least a portion of the laser radiation radiated from the radiation exit window $32_1$ of this semiconductor laser 324 in the direction toward this input and/or output 21.

The portion deflected by the left semitransparent deflecting mirror 51, arranged between the input and/or output 21 of the left row 20 of the terminal installation 2 and the semiconductor laser 324, is supplied by a deflecting mirror means 50 to the detector 321 allocated to this input and/or output 21.

Correspondingly, the portion deflected by the right semitransparent deflecting mirror 51, arranged between the input and/or output 21 of the right row 20 of the terminal installation and the semiconductor laser 322, is supplied by a deflecting mirror means 50 to the detector 323 allocated to this input and/or output 21.

On the side of the other radiation exit window $32_2$ of the semiconductor laser 324, a deflecting mirror 55 is arranged on the axis 201, arranged obliquely at an angle to the axis 201, for the deflection of the laser radiation that is radiated in the direction of this deflecting mirror 55 from the other radiation exit window $32_2$ of this semiconductor laser 324, said deflection being in the direction to the left output 23, allocated to this semiconductor 3, of the terminal installation 2.

Correspondingly, a semitransparent deflecting mirror 51 is arranged between the input and/or output 21 of the right row 20 and the semiconductor laser 322, arranged obliquely at an angle of e.g. 45° to the axis 201, for the deflection out of the axis 201, at an angle of e.g. 90°, of at least a portion of an optical signal supplied from this input and/or output 21 along the axis 201, and in order to let through at least a portion of the laser radiation radiated from the radiation exit window $32_1$ of this semiconductor laser 322 in the direction toward this input and/or output 21.

The portion deflected by this semitransparent deflecting mirror 51 is supplied to the detector 323 allocated to this input and/or output 21 of the right row 20, likewise by a deflecting mirror means 50.

Opposite the other radiation exit window $32_2$ of the semiconductor laser 322, a deflecting mirror 55 is arranged on the axis 201, arranged obliquely at an angle of e.g. 45° to the axis 201, for the deflection of the laser radiation, radiated from this radiation exit window $32_2$ in the direction of this deflecting mirror 55, in the direction toward the right output 23, allocated to this semiconductor laser 322, of the terminal installation 2.

Each deflecting mirror arrangement 50 comprises two deflecting mirrors $50_1$ and $50_2$, of which the deflecting mirror $50_1$ deflects to the other deflecting mirror $50_2$ the portion of the optical signal deflected out of the axis 201 by the semitransparent deflecting mirror 51. The deflecting mirror $50_2$ supplies this portion to the allocated detector 321 or, respectively, 323.

It is to be noted that the inputs and/or outputs 21, the input(s) 22 and the output 23 of the terminal installation 2 can be imaginary inputs rather than real ones, e.g. can be points in imaginary boundary surfaces of the terminal installation 2, through which light enters.

The manner of operation of the design according to FIG. 5 is as follows:

An optical signal, supplied as an optical unguided beam to the input and/or output 21 of the left row 20 to the input and/or output $31_1$ of the transmission channel 31, passes through the left beam shaping element 17, strikes the left semitransparent deflecting mirror 51, is reflected upward by this semitransparent beam splitter 51, strikes the left deflecting mirror $50_1$, is deflected to the right by the mirror $50_1$, strikes the right deflecting mirror $50_2$, and is deflected by it onto the right photo-detector 321.

The electrical signal of this detector 321 corresponding to the supplied optical signal is amplified in the electrical amplifier 325, and the amplified electrical signal is supplied through the electrical line $16_1$ to the right optical transmitter 322, which produces an optical signal corresponding to the amplified electrical signal, which optical signal proceeds undeflected to the right through the right semitransparent deflecting mirror 51, and through the right beam shaping element 17, to the input and/or output 21 of the right row 20, and is supplied from this input and/or output 21 as an optical unguided beam to the input and/or output $31_1$ of the right part of the transmission channel 31, and in this right part is transmitted to the right, e.g. to a next terminal installation 2.

The radiation from the other radiation exit window $32_2$ of the optical transmitter 322 is deflected upward by the right deflecting mirror 55, passes through the right beam shaping element 18 and proceeds as an optical unguided beam through the right output 23 of the terminal installation 2 to the detector 5, allocated to this right output 22, of the connected electronic device 1, which produces an electrical signal corresponding to the supplied optical signal, which electrical signal is amplified in the downstream electrical amplifier 15, so that the applied optical signal is present as electrical voltage or current in the electronic device 1.

An optical signal supplied to the input and/or output 21 of the right row 20 from the input and/or output $31_1$ of the right part of the transmission channel 31 as an optical unguided beam passes through the right beam shaping element 17, is reflected upward by the right semitransparent deflecting mirror 51, strikes the right deflecting mirror $50_1$, is deflected to the left by this deflecting mirror $50_1$, strikes the left semitransparent deflecting mirror $50_2$ and is deflected by it onto the left detector 323. The electrical signal from this detector 323, corresponding to the supplied optical signal, is amplified in the electrical. amplifier 327 and is supplied to the optical transmitter 324 through the electrical line $16_2$, which transmitter produces an optical signal corresponding to this amplified electrical signal, which optical signal proceeds undeflected to the left through the left semitransparent deflecting mirror 51 and through the left beam shaping element 17 to the input and/or output 21 of the left row 20, and from this is supplied, as an optical unguided beam, to the input and/or output $31_1$ of the left part of the transmission channel 31, and in this left part is transmitted to the left, e.g. to a next terminal installation 2.

The radiation from the other radiation exit window $32_2$ of the transmitter 324 is deflected upward by the left deflecting mirror 55, passes through the left beam shaping element is, and is led through the left output 23 of the terminal installation 2 as an optical unguided beam to the detector 5, allocated to this left output 23, of the connected electronic device 1, which produces an electrical signal corresponding to the supplied optical signal, which optical signal is amplified in the downstream electrical amplifier 15, so that the supplied optical signal is present in the device 1 as an electrical voltage or current.

In both cases, the optical signal is regenerated and passed through a lock, and is additionally given to the optical device 1.

If in contrast the electrical device 1 is active, the optical transmitter 4 thereof, which is for example a semiconductor laser, radiates its light oil tile two detectors 321 and 323 of the terminal installation 2. the semiconductor laser 4 can be metallized on the rear side turned away from the terminal installation 2, since it has to transmit only in one direction.

An optical means 40 is usefully arranged between the detectors 321 and 323 of the terminal installation 2 and the transmitter 4 of the connected electronic device 1, which optical means combines the characteristics of a beam splitter and a beam shaping element. This optical means 40 can be arranged in the terminal installation 2 or, as shown in FIG. 5, can be arranged in the electronic device 1 or between the terminal installation 2 and the electronic device 1.

The optical installation 40 splits the light beam emanating from the transmitter 4 into two sub-beams, of which one is supplied to the detector 321 and the other is supplied to the detector 323, and at the same time bundles or focuses each of these sub-beams onto the detector 321 or, respectively, 323. The optical means 40 is preferably a holographically optical element. The optical signal produced by the transmitter 4 of the connected electronic device 1 moves through the optical means 40 in the two sub-beams to the detectors 321 and 323, is converted into corresponding electrical signals that are supplied in amplified form to the optical transmitters 323 and 324 of the terminal installation 2, and are reconverted by these into corresponding optical signals that are supplied to the two inputs and/or outputs 21 of the right and left row 20. The information contained in these optical signals is thus transmitted both to the right and to the left in the present invention.

Various embodiments are possible for the design according to FIG. 5. Guided optical waves or freely propagated optical waves can thereby be selected in various combinations, whereby care must be taken only that optical waves should propagate freely at interfaces of the terminal installation 2 with optical channels 31 and with electronic devices, so that an unguided beam connection is possible.

An embodiment of the design according to FIG. 5 is presented in FIG. 6, whereby only the part that lies to the right of the broken line 100 in FIG. 5 is represented, since the part lying to the left of this line 100 is of analogous construction.

In this embodiment, the transmission and reception units contained in the terminal installation 2, of which each is constructed as a transmission and reception unit according to FIG. 5, is arranged on a substrate 110 that is to be fastened to the bearer element 10.

The substrate 110 can consist of a suitably chosen material, e.g. metal or also silicon, that satisfies the mechanical requirements as well as the heat transfer requirements.

Besides the transmission and reception units, the optical transmission channels 31 are also attached to this substrate 110 in the form of waveguides that connect the individual transmission and reception units of different terminal installations 2 with one another.

The optical detector 321, the electrical amplifier 325 allocated to this detector 321 and the semiconductor laser 322 allocated to this detector 321 are integrated in hybrid fashion on the substrate 110. The other detector 323, the electrical amplifier allocated to this detector 323 and the semiconductor laser 324 (not shown) allocated to this detector 323 are likewise integrated in hybrid fashion on the substrate 110.

The semiconductor laser 322 and the deflecting mirror 55 allocated to it are monolithically integrated. The same holds for the semiconductor laser 324 and the deflecting mirror 55 allocated to it. Conventional edge emitters can be used, in which one side is provided with a mirror that stands obliquely at an angle of e.g. 45° to the axis 201. Other suitable laser diodes can also be used, if they radiate only horizontally and vertically, as shown in FIG. 6.

The wavelength of the laser light is in principle arbitrary, since, given the short distances to be bridged here, damping differences are hardly present in the waveguides 31. Only the photodetectors 321 and 323, but also the photodetectors 5 of the electronic devices 1, must be tuned to the laser wavelengths. All previously standard wavelengths, from about 0.6 µm to 1.6 µm, can be used.

The optical means 40 and the beam shaping element 17 are constructed as a holographic optical element.

The beam shaping element 17 and the semitransparent deflecting mirror 51 are monolithically integrated on a common bearer element 36 that is arranged on the substrate 110.

The semitransparent mirror 51 comprises a wavelength filter that lets through a wavelength $\lambda_2$ transmitted from the radiation exit window $32_1$ of the semiconductor laser 322 in the direction to the input and/or output 21 of the right row 20 of the terminal installation 2, but however reflects another wavelength $\lambda_1$ supplied from the waveguide 31 through this input and/or output 21. The deflection means 50 is constructed as a microoptical waveguide $50_3$, on which the two deflecting mirrors $50_1$ and $50_2$ of the deflection means 50 are fashioned in the form of optically refracting surfaces that are arranged obliquely at an angle of e.g. 45° to an optical axis 503 of this waveguide $50_3$. The deflecting mirrors $50_1$ and $50_2$, allocated to the input and/or output 21 of the left row 20, and also the deflecting mirrors $50_1$ and $50_2$ allocated to the input and/or output 21 of the right row 20 of tile terminal installation 2, can be integrated in this waveguide. For example, in the represented waveguide $50_3$, the deflecting mirror $50_2$, which is allocated to the detector 321, is also arranged and drawn in with broken lines. It is transparent for the wavelength $\lambda_1$, but acts in a reflecting manner oil the wavelength $\lambda_2$, since it has to supply this wavelength to the photodetector 321. In contrast, the deflecting mirror $52_2$, allocated to the detector 323, is transparent for the wavelength $\lambda_2$, and reflects the wavelength $\lambda_1$ to this detector 323.

The beam shaping element 18, which supplies the deflected laser radiation from the radiation exit window $32_2$ of the semiconductor laser 322 to the right output 23 of the terminal installation 2, is constructed in the form of a lens.

The waveguides 31 are attached to a spacer element 35 attached to the substrate 110, so that they lie at the same height as the semiconductor lasers 322 and 324.

It is advantageous if the optical transmitters 322, which radiate to the inputs and/or outputs 21 of the right row of the terminal installation 2, comprise a different wavelength than the transmitters 324, which radiate in the direction of the inputs and/or outputs 21 of the left row 20 of the terminal installation 2. For example, the transmitters 324 radiate the wavelength $\lambda_1$ from the radiation exit window $32_2$, and the transmitters 322 radiate the other wavelength $\lambda_2$ from the radiation exit window $\lambda 2$. In this way, it is ensured that no unavoidable losses arise during the deflection to the semi-transparent deflection mirror 51 containing the wavelength filter.

Although modifications and changes may be suggested by those skilled in the art, it is the intention of the inventors to embody within the patent warranted hereon all changes and modifications as reasonably and properly come within the scope of their contribution to the art.

We claim:

1. An apparatus for optically and electrically connecting a plurality of electronic components, the apparatus comprising:

a plurality of spaced-apart terminals arranged on a base element, each terminal being connected to one electronic component, each terminal comprising a left side optical input and output, and a right side optical input and output, the right side and left side optical inputs and outputs comprising a same number of channels for the transmission and reception of optical signals, each terminal further comprising at least component input that is optically connected to a transmitter for receiving a component optical signal produced by the transmitter, the transmitter being connected to the electronic component that is connected to the respective terminal, each terminal further comprising at least component output that is optically connected to a receiver for the transmission of a terminal optical signal to the receiver, the receiver being connected to the electronic component that is connected to the respective terminal, adjacent terminals being connected by a plurality of transmission channels, each transmission channel connecting at least one optical output of one terminal to the optical input of an adjacent terminal and at least one optical output of said adjacent terminal to the optical input of said one terminal, the optical inputs and outputs of the right and left sides of each terminal being optically connected by a parallel connection channel comprising a first optical detector disposed between the input of right side and the output of the left side for detecting an optical signal supplied from the input of the right side, the first optical detector producing a first electrical signal corresponding to the optical signal supplied from the input of the right side, a first optical transmitter connected to the first optical detector for receiving the first electrical signal, the first optical transmitter producing a first optical signal corresponding to the first electrical signal, the first optical signal being communicated to the output of the left side, a second optical detector disposed between the input of left side and the output of the right side for detecting an optical signal supplied from the input of the left side, the second optical detector producing a second electrical signal corresponding to the optical signal supplied from the input of the left side, a second optical transmitter connected to the second optical detector for receiving the second electrical signal, the second optical transmitter producing a second optical signal corresponding to the second electrical signal, the second optical signal being communicated to the output of the right side.

2. The apparatus of claim 1 wherein the parallel connection channels are further characterized as being optoelectrical channels.

3. The apparatus of claim 1 wherein the electronic components transmit an optical signal to both the right side optical input and the left side optical input of the terminal to which they are connected.

4. The apparatus of claim 1 wherein at least one of the electronic components receives an optical signal from both the right side optical output and the left side optical output of the terminal to which they are connected.

5. The apparatus of claim 1 wherein at least one electronic component transmits a single optical signal from the transmitter to either the right side optical input or the left side optical input of the terminal to which it is connected.

6. The apparatus of claim 5 wherein at least one of the electronic components receives an optical signal from both the right side optical output and left side optical output of the terminal to which it is connected.

7. The apparatus of claim 1, whereby at least one of the transmission channels comprise an optical waveguide.

8. The apparatus of claim 1 wherein at least one of the transmission channels is optically connected to its respective terminal by an optical unguided beam connection.

9. The apparatus of claim 1 wherein at least one of the transmitters is optically connected to its respective terminal by an optical unguided beam connection.

10. The apparatus of claim 1 wherein at least one of the receivers is optically connected to its respective terminal by an optical unguided beam connection.

11. The apparatus of claim 1 wherein at least one of the electronic components is optically connected to its respective terminal by an optical unguided beam connection.

12. The apparatus of claim 1 further comprising at least one optical multiplexer/demultiplexer is disposed on the base element and between the transmission channels of adjacent terminals.

13. The apparatus of claim 1 further comprising at least one optical multiplexer/demultiplexer disposed on the base element and between a transmission channel and an electronic component.

14. An apparatus for optically and electrically connecting a plurality of electronic components, the apparatus comprising:

a plurality of spaced-apart terminals arranged on a base element, each terminal being connected to one electronic component, each terminal comprising a left side optical input and output, and a right side optical input and output, the right side and left side optical inputs and outputs comprising a same number of channels for the transmission and reception of optical signals, each terminal further comprising at least component input that is optically connected to a transmitter for receiving a component optical signal produced by the transmitter, the transmitter being connected to the electronic component that is connected to the respective terminal, each terminal further comprising at least component output that is optically connected to a receiver for the transmission of a terminal optical signal to the receiver, the receiver being connected to the electronic component that is connected to the respective terminal, adjacent terminals being connected by a plurality of transmission channels, each transmission channel connecting at least one optical output of one terminal to the optical input of an adjacent terminal and at least one optical output of said adjacent terminal to the optical input of said one terminal, the optical inputs and outputs of the right and left sides of each terminal being optically connected by a parallel connection channel comprising
- a first optical detector disposed between the input of right side and the output of the left side for detecting an optical signal supplied from the input of the right side, the first optical detector producing a first electrical signal corresponding to the optical signal supplied from the input of the right side,
- a first controllable optical transmitter connected to the first optical detector for receiving the first electrical signal, the first controllable optical transmitter producing a first optical signal corresponding to the first electrical signal, the first optical signal being communicated to the output of the left side,
- a second optical detector disposed between the input of left side and the output of the right side for detecting an optical signal supplied from the input of the left side, the second optical detector producing a second electrical signal corresponding to the optical signal supplied from the input of the left side, and
- a second controllable optical transmitter connected to the second optical detector for receiving the second electrical signal, the second controllable optical transmitter producing a second optical signal corresponding to the second electrical signal, the second optical signal being communicated to the output of the right side.

15. The apparatus of claim 14 wherein a first electrical amplifier is connected to the first optical detector, the first amplifier for amplifying the first electrical signal, and a second amplifier is connected to the second optical detector, the second amplifier for amplifying the second electrical signal.

16. The apparatus of claim 14 wherein the component optical signal produced by the transmitter connected to the electrical component is received by both the first and second optical detectors, the first optical detector producing a third electrical signal corresponding to the component optical signal communicated from the transmitter, the first controllable optical transmitter receiving the third electrical signal and producing a third optical signal corresponding to the third electrical signal, the third optical signal being communicated to the output of the left side, and the second optical detector producing a fourth electrical signal corresponding to the component optical signal communicated from the transmitter, the second controllable optical transmitter receiving the fourth electrical signal and producing a fourth optical signal corresponding to the fourth electrical signal, the fourth optical signal being communicated to the output of the right side.

17. The apparatus of claim 16 wherein the first and second controllable optical transmitters each comprise a first and second semiconductor laser respectively, each semiconductor laser having two radiation exit windows disposed on opposing ends of the lasers, the lasers producing optical signals directed in opposing directions and exiting from the exit windows, an optical signal from one of said radiation exit windows of the first controllable optical transmitter being directed toward an output of the left side of the terminal and an optical signal from the opposing window of the first controllable optical transmitter being directed toward a first receiver connected to the electric component, an optical signal from one of said radiation exit windows of the second controllable optical transmitter being directed toward an output of the right side of the terminal and an optical signal from the opposing window of the second controllable optical transmitter being directed toward a second receiver connected to the electric component.

18. The apparatus of claim 17 wherein the first and second semiconductor lasers are disposed along a common axis, the apparatus further comprising a first semitransparent deflecting mirror disposed between the first semiconductor laser and the output of the left side of the terminal, the first semitransparent deflecting mirror deflecting part of the optical signal from the first semiconductor laser out of the axis to the second optical detector, the first semitransparent deflecting mirror further permitting a portion of the optical signal from the first semiconductor laser to pass through to the output of the left side of the terminal, the apparatus further comprising a second semitransparent deflecting mirror disposed between the second semiconductor laser and the output of the right side of the terminal, the second semitransparent deflecting mirror deflecting part of the optical signal from the second semiconductor laser out of the axis to the first optical detector, the second semitransparent deflecting mirror further permitting a portion of the optical signal from the second semiconductor laser to pass through to the output of the right side of the terminal.

19. The apparatus of claim 18 wherein a plurality of opaque defecting mirrors are disposed between the first semitransparent deflecting mirror and the second optical detector as well as between the second semitransparent deflecting mirror and the first optical detector.

20. The apparatus of claim 18 wherein at least two opaque deflecting mirrors are disposed between the first semitransparent deflecting mirror and the second optical detector, one of which deflects to the other deflecting mirror the portion of the optical signal deflected out of the axis by the first semitransparent deflecting mirror and the other of which deflects said portion of the optical signal to the second optical detector, and wherein at least two opaque deflecting mirrors are disposed between the second semitransparent deflecting mirror and the first optical detector, one of which deflects to the other deflecting mirror the portion of the optical signal deflected out of the axis by the second semitransparent deflecting mirror and the other of which deflects said portion of the optical signal to the first optical detector.

21. The apparatus of claim 20, whereby the two opaque deflecting mirrors disposed between the first semitransparent deflecting mirror and the second optical detector comprise optically refracting surfaces of a first optical waveguide having an optical axis that guides the portion of the optical signal, said refracting surfaces are arranged obliquely at an angle to the optical axis the first waveguide, and whereby the two opaque deflecting mirrors disposed between the second semitransparent deflecting mirror and the first optical detector comprise optically refracting surfaces of a second optical waveguide having an optical axis that guides the portion of the optical signal, said refracting surfaces are arranged obliquely at an angle to the optical axis the second waveguide.

22. An apparatus for optically and electrically connecting a plurality of electronic components, the apparatus comprising:

a plurality of spaced-apart optoelectronic terminals arranged on a base element, each optoelectronic terminal being connected to one electronic component, each optoelectronic terminal comprising a left side optical input, a left side optical output, a right side optical input and a right side optical output, the right side and left side optical inputs and outputs comprising a same number of channels for the transmission and reception of optical signals, each terminal further comprising at least two component inputs, both of which are optically connected to a common transmitter for receiving a component optical signal produced by the transmitter, the transmitter being connected to the electronic component that is connected to the respective terminal, each terminal further comprising at least two component outputs each of which are optically connected to at least one receiver for the transmission of a terminal optical signal to the receiver, the receiver being connected to the electronic component that is connected to the respective terminal, adjacent terminals being connected by a plurality of transmission channels, each transmission channel connecting at least one optical output of one terminal to the optical input of an adjacent terminal and at least one optical output of said adjacent terminal to the optical input of said one terminal, the optical inputs and outputs of the right and left sides of each terminal being optically connected by a parallel connection channel comprising a first optical detector disposed between the input of right side and the output of the left side for detecting an optical signal supplied from the input of the right side, the first optical detector producing a first electrical signal corresponding to the optical signal supplied from the input of the right side, a first controllable optical transmitter connected to the first optical detector for receiving the first electrical signal, the first controllable optical transmitter producing a first optical signal corresponding to the first electrical signal, the first optical signal being communicated to the output of the left side, a second optical detector disposed between the input of left side and the output of the right side for detecting an optical signal supplied from the input of the left side, the second optical detector producing a second electrical signal corresponding to the optical signal supplied from the input of the left side, and a second controllable optical transmitter connected to the second optical detector for receiving the second electrical signal, the second controllable optical transmitter producing a second optical signal corresponding to the second electrical signal, the second optical signal being communicated to the output of the right side.

23. An apparatus for optically and electrically connecting a plurality of electronic components, the apparatus comprising:

a plurality of spaced-apart optoelectronic terminals arranged on a base element, each optoelectronic terminal being connected to one electronic component, each optoelectronic terminal comprising a left side optical input, a left side optical output, a right side optical input and a right side optical output, the right side and left side optical inputs and outputs comprising a same number of channels for the transmission and reception of optical signals, each terminal further comprising at least two component inputs, both of which are optically connected to a common transmitter for receiving a component optical signal produced by the transmitter, the transmitter being connected to the electronic component that is connected to the respective terminal, each terminal further comprising at least two component outputs each of which are optically connected to at least one receiver for the transmission of a terminal optical signal to the receiver, the receiver being connected to the electronic component that is connected to the respective terminal, adjacent terminals being connected by a plurality of transmission channels, each transmission channel connecting at least one optical output of one terminal to the optical input of an adjacent terminal and at least one optical output of said adjacent terminal to the optical input of said one terminal, the optical inputs and outputs of the right and left sides of each terminal being optically connected by a parallel connection channel comprising a first optical detector disposed between the input of right side and the output of the left side for detecting an optical signal supplied from the input of the right side, the first optical detector producing a first electrical signal corresponding to the optical signal supplied from the input of the right side, a first controllable optical transmitter connected to the first optical detector for receiving the first electrical signal, the first controllable optical transmitter producing a first optical signal corresponding to the first electrical signal, the first optical signal being communicated to the output of the left side, a second optical detector disposed between the input of left side and the output of the right side for detecting an optical signal supplied from the input of the left side, the second optical detector producing a second electrical signal corresponding to the optical signal supplied from the input of the left side, and a second controllable optical transmitter connected to the second optical detector for receiving the second electrical signal, the second controllable optical transmitter producing a second optical signal corresponding to the second electrical signal, the second optical signal being communicated to the output of the right side, and wherein the component optical signal produced by the transmitter connected to the electrical component is received by the first and second optical detectors, the first optical detector producing a third electrical signal corresponding to the component optical signal communicated from the transmitter, the first controllable optical transmitter receiving the third electrical signal and producing a third optical signal corresponding to the third electrical signal, the third optical signal being communicated to the output of the left side, and the second optical detector producing a fourth electrical signal corresponding to the component optical signal communicated from the transmitter, the second controllable optical transmitter receiving the fourth electrical signal and producing a fourth optical signal corresponding to the fourth electrical signal, the fourth optical signal being communicated to the output of the right side.

* * * * *